United States Patent [19]

Cline

[11] Patent Number: 5,048,884
[45] Date of Patent: Sep. 17, 1991

[54] CASE FILLING AND UNLOADING APPARATUS

[76] Inventor: Bobby G. Cline, 2727 Bella Vista St., Lakeland, Fla. 33809-8713

[21] Appl. No.: 501,031

[22] Filed: Mar. 29, 1990

[51] Int. Cl.⁵ ............... B25J 15/08; B65B 21/18
[52] U.S. Cl. ........................... 294/87.24; 294/163
[58] Field of Search ............. 294/28, 31.1, 87.1, 294/87.2, 87.22, 87.24, 87.26, 159, 162-165; 53/247, 390

[56] References Cited

U.S. PATENT DOCUMENTS

| | | | |
|---|---|---|---|
| 689,694 | 12/1901 | Snow et al. | 294/87.24 |
| 929,464 | 7/1909 | McGinnis. | |
| 2,140,314 | 12/1938 | Doscher | 294/87.24 |
| 2,378,026 | 6/1945 | Morgan | 294/87.22 |
| 2,398,747 | 4/1946 | Keith et al. | 294/87.24 |
| 2,441,494 | 5/1948 | Larmett et al. | 294/87.24 |
| 2,463,916 | 3/1949 | Smola | 294/87.24 |
| 2,514,252 | 7/1950 | Mueller | 294/87.22 |
| 2,680,041 | 6/1954 | Gribskov | 294/87.24 |
| 2,819,576 | 1/1958 | Hendricks et al. | 53/247 |
| 3,397,504 | 8/1968 | Drennan | 53/390 |
| 4,055,943 | 11/1977 | Reichert | 53/247 |
| 4,211,056 | 7/1980 | Birk | 53/247 |
| 4,300,330 | 11/1981 | Hartness | 53/247 |
| 4,807,917 | 2/1989 | Bunting | 294/87.24 |

Primary Examiner—Johnny D. Cherry
Attorney, Agent, or Firm—Pettis & McDonald

[57] ABSTRACT

An apparatus for assisting the manual loading and unloading of bottles into and out of cases comprising a guide plate, a bottle holder, a bottle holder actuating mechanism, and a handle. The bottle holder comprises a pair of flaps pivotally connected to the guide plate, the flaps being adjacent and parallel to one another, and the flaps being movable between a closed and an open position. The flaps have a bottle retaining structure for retaining the bottles in the bottle holder. Each flap of the pair of flaps of the bottle holder has a pivot axis about which the flaps may pivot. The pivot axis is located below a plane defined by the tops of the bottles when the bottles are retained by the bottle retaining structure. The flaps are selectively moved between the open and the closed position by the bottle holder actuating mechanism, capturing the bottles within the bottle retaining structure. The case filling and unloading apparatus, with the bottles captured therein, may be lifted by a handle connected to the guide plate and moved from place to place.

8 Claims, 2 Drawing Sheets

CASE FILLING AND UNLOADING APPARATUS

BACKGROUND OF THE INVENTION

1. Field of the Invention.

The present invention relates to an apparatus for holding a plurality of bottles so that they may be manually lifted and moved from one spot to another including into and out of packing cases.

2. Description of the Prior Art.

Complex automated machines for filling, capping and packing bottles within cases have been in existence for a number of years. These machines replace the labor intensive manual movement of bottles on a one or two bottle at a time basis, vastly speeding up the bottling industry.

In the bottling industry, when the complex bottling machinery is out of operation, each bottle must be moved by hand, slowing down case loading operations. A need exists for a simple, portable apparatus that can effectively increase the speed with which the manual movement of bottles is accomplished, particularly to replace or supplement packing of bottles in cases for shipment. This same device can be used to stock supermarket shelves more efficiently and to load empties into cases for return to the bottling plant.

The movement of bottles along production lines and into packing cases is largely done by complex machinery A key feature of this machinery is the means for gripping the bottles during the case loading process. U. S. patents issued to Hendricks, et al., U.S. Pat. No. 2,819,576; Reichert, U.S. Pat. No. 4,055,943; Birk, U.S. Pat. No. 4,211,056; and Hartness, U.S. Pat. No 4,300,330, each disclose a typical means for gripping bottles The invention to Hendricks, et al. discloses opposing laterally sliding clamps which squeeze the bottle top; Birk discloses opposing slotted plates which clamp below the bottle tops from above; Reichert discloses multiple fingers which grip the top of the bottle from above; and Hartness discloses opposing jaws formed of two plates which clamp the bottle below the bottle top from above.

U.S. Pat. No. 3,397,504, issued to J. G. Drennan, discloses a manual means for picking up a single row of bottles. This device has a fixed base plate having a single row of holes sized to fit over bottles and a fixed slotted plate located in spaced axial relation to the base plate. The holes of the base plate fit over the row of bottles at an angle so that when the device is brought to a vertical position, the slots of the slotted plate may engage the bottle tops. The device will not lift more than one row at a time due to the tilting requirement.

U.S. Pat. No. 929,464, issued to B. W. McGinnis, discloses two plates having holes that are axially aligned when the plates are in an open position. When the bottle tops are projected through the holes and the plates are slid in relation to one another, the opposing edges of the holes engage and hold the bottles.

With the exception of McGinnis and Drennan, the prior art disclosed above is related to very complex machinery; such art is inappropriate for portable equipment. The patent to McGinnis is for a bottle dipper, and the patent to Drennan provides for movement of only one row of bottles at a time; therefore, there is a need for a device that is structured to efficiently assist the manual packing/unpacking of cases of bottles, and to assist the manual movement of large quantities of bottles from one place to another.

SUMMARY OF THE INVENTION

The present invention relates to a case filling and unloading apparatus for handling one or more bottles which have been arranged in a predetermined pattern, and wherein each bottle has a top, a lifting means adjacent to the top, a shoulder, a body portion and a bottom. The case filling and unloading apparatus comprises a guide plate having a top surface and a bottom surface, and having apertures therethrough, said apertures spaced in a predetermined pattern and sized to fit about the bottles such that when the guide plate is placed over the bottles with the bottom face facing downward, the tops of the bottles project upward through the apertures.

Attached to the guide plate is a bottle holder which is comprised of at least one pair of flaps, each of the flaps having a first and a second edge. The flaps are pivotally connected along their first edge to the guide plate. When the flaps are pivoted about their first edge, they are selectively moved between a closed position and an open position. The closed position is defined by the second edges of each pair of flaps residing adjacent to one another, and the open position is defined by the second edges of the pair of flaps being spaced apart from one another. To be in the fully open position, the flaps must be spaced apart far enough to permit the lifting means of the bottles to project upward through the guide plate apertures and between the flaps.

The second edges of each pair of flaps have opposing cutouts located such that when the flaps are in the closed position, a hole is defined. The first edges of the flaps are so located in relation to the guide plate that the holes defined by the cutouts in the flaps generally overlap the apertures through the guide plate. The holes in the flaps defined by the opposing cutouts are so dimensioned that at least a portion of the hole has a diameter smaller than the diameter of the bottle lifting means.

Connected to the bottle holder is an actuating means for selectively urging the flaps of the loader between the open and the closed positions. In addition, a handle means is connected to the guide plate to provide a mean for lifting and moving the case filling and unloading apparatus from one point to another.

When the apparatus has been urged to the open position and the guide plate oriented with the bottom surface facing downward toward the bottles, which have been arranged in a predetermined pattern, the apparatus may be placed over the bottle tops and downward so that the bottle tops extend upward through the apertures in the guide plate and between the open flaps. When the bottle holder is urged by the actuating means into the closed position, the cutouts of the flaps close about the bottle neck below the bottle lifting means so that as the case filling and unloading apparatus is lifted upward by its handles, the closed flaps engage the bottle lifting means to retain the bottles within the apparatus.

When the case filling and unloading apparatus is placed at its destination, the bottle holder is actuated urging the flaps into the open position releasing the bottles so that the case filling and unloading apparatus may be removed leaving the bottles within a case, or at a new location.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings

DETAILED DESCRIPTION

Figure 1:
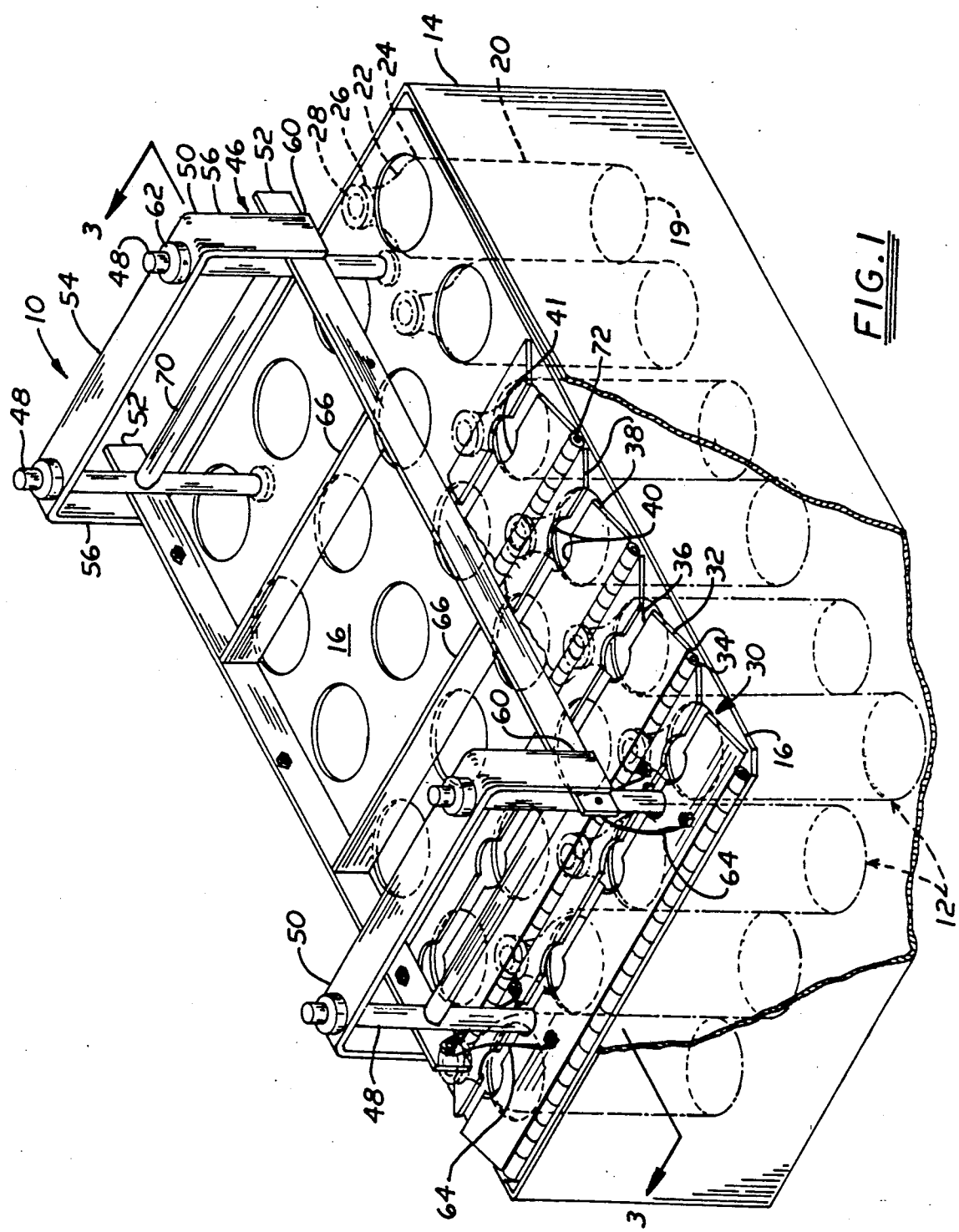
FIG. 1 is an isometric view of a preferred embodiment of the case filling and unloading apparatus with the bottles shown in phantom and a box shown in cut-away.

A preferred embodiment for the case filling and unloading apparatus of this invention is illustrated in the drawing figures. The case filling and unloading apparatus is generally indicated as 10 in the views of FIGS. 1-5, and the bottles, generally indicated as 12, are shown in phantom in FIG. 1. A case, or box, generally indicated as 14 is shown in cut-away in FIG. 1.

Figure 5:
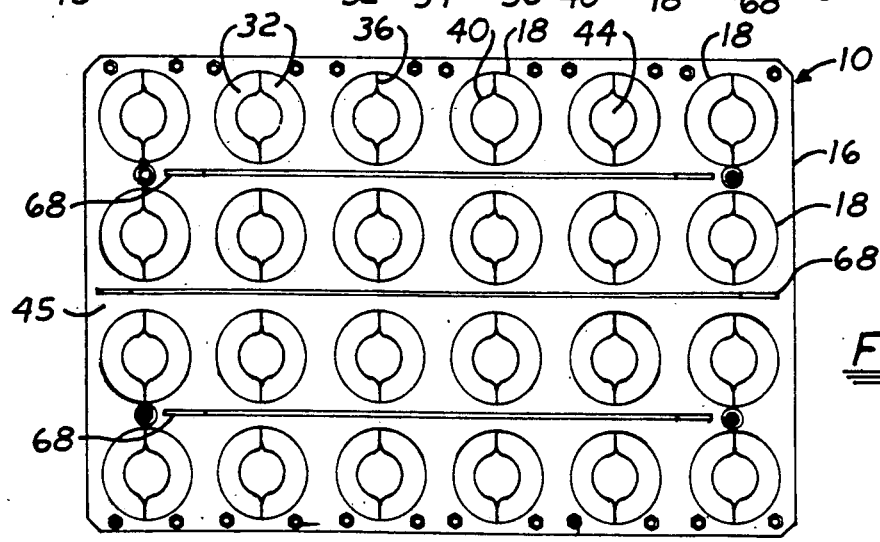
FIG. 5 is a bottom plan view of the case filling and unloading apparatus as shown in FIG. 2.

Referring first to FIG. 1 and FIG. 5, it can be seen that the case filling and unloading apparatus 10 comprises a guide plate 16 having a plurality of apertures 18 passing therethrough. In the preferred embodiment, there are 24 apertures arranged in a 4×6 pattern which is the standard arrangement for a case of soft drink bottles; however, the number of apertures 18 and the configuration of these apertures may be made to suit any requirement. In addition, the apertures may be sized and shaped to fit different bottle configurations. In the preferred embodiment, the bottle 12 disclosed as being used with the invention is a soft drink bottle having a bottom 19, a body portion 20, a neck portion 22, a shoulder 24, interposed between the body portion 20 and the neck portion 22, a bottle lifting means 26, and a bottle top 28. The bottle lifting means 26 may be the cap of the bottle, the bottom edge of the threads for a bottle with a screw cap, a ridge placed intermediate the cap and the shoulder of the bottle to assist machinery in grasping bottles during filling and processing, or any similar means well known in the industry. In this application, the term bottle is defined as any container having a neck portion and a bottle lifting means.

Figure 2:
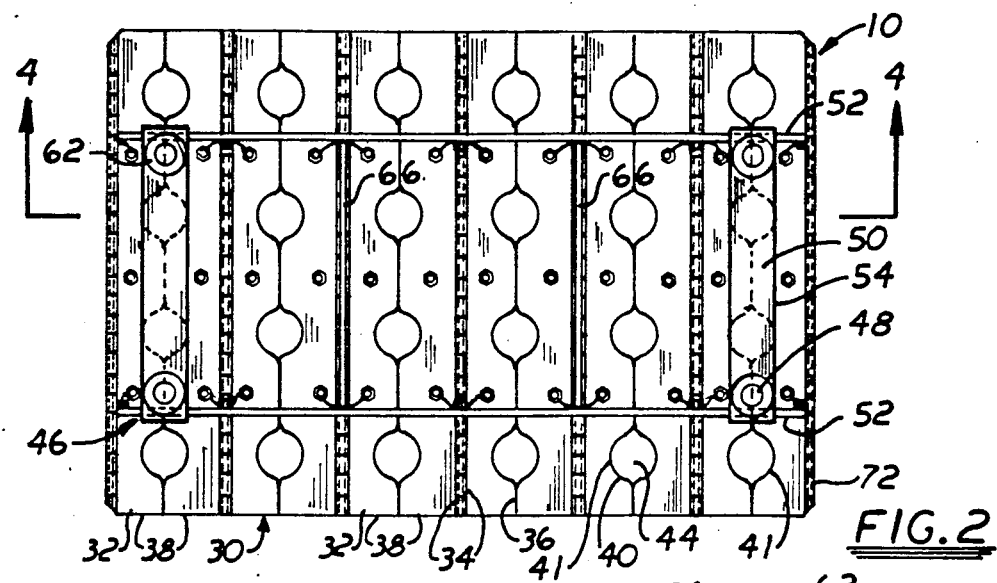
FIG. 2 is a top plan view of the preferred case filling and unloading apparatus.

The preferred embodiment discloses six bottle holders shown generally as 30, each bottle holder 30 comprising a pair 38 of opposed flaps 32, each flap 32 having a first edge 34 and a second edge 36. The first edges 34 of the flaps 32 are pivotally connected to the guide plate 16. Four cutouts 40 are spaced along the second edge 36 of each flap 32. The bottle holder 30 has an open position as seen in FIG. 1, and more clearly in FIG. 3, and a closed position as seen in FIGS. 2 and 4. The closed position is defined by when the second edges 36 of the flaps 32 of each pair of flaps 38 reside adjacent to one another, while the open position is defined by the second edge 36 of the flaps 32 of each pair of flaps 38 being spaced apart from one another, resulting in a gap 42. When the flaps 32 are closed, the cutouts 40 generally define a hole 44 which is sized so that at least a portion of the hole 44 has a diameter smaller than the diameter of the bottle lifting means 26.

The bottle holder 30 is so sized and configured that when it is attached to the guide plate 16, the holes 44 defined by the bottle holder 30 in the closed position generally overlap with the apertures 18 of the guide plate 16. Thus, with the bottle holder 30 in the open position, the top 28 of the bottle 12 may be inserted from the bottom 45 of the guide plate 16 upward through the aperture 18 of the guide plate 16 and into the gap 42 between the flaps 32 until the bottle lifting means 26 has cleared the second edge 36 of the flaps 32. The bottle holder 30 may then be moved to the closed position, causing the cutouts 40 of the flaps 32 to close about the neck 22 of the bottle 12 below the bottle lifting means 26. The bottle lifting means 26 of the bottle 12 may then be rested upon the edges 41 of the cutouts 40; the bottle 12 is thus captured within the hole 44. In the preferred embodiment, the apertures 18 of the guide plate 16 are sized so that when they are placed over the top 28 of bottle 12, the guide plate 16 comes to rest on the neck 22 intermediate the shoulder 24 and the bottle lifting means 26. The aperture 18 may be sized to fit around the body portion 20.

In the example shown as the preferred embodiment, the bottles 12 are short necked; however, the case filling and unloading apparatus 10 may be so sized and configured to fit other bottle shapes as required.

Figure 3:
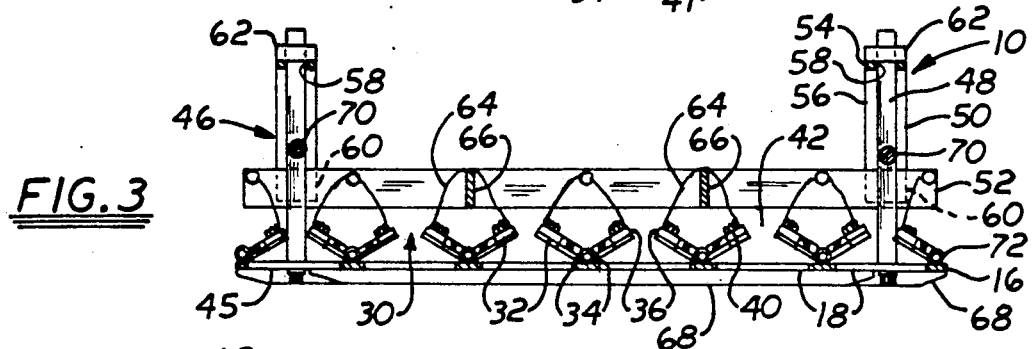
FIG. 3 is a sectional front elevation view of the case filling and unloading apparatus taken along line 3—3 of FIG. 1 illustrating the flaps in an open position.
Figure 4:
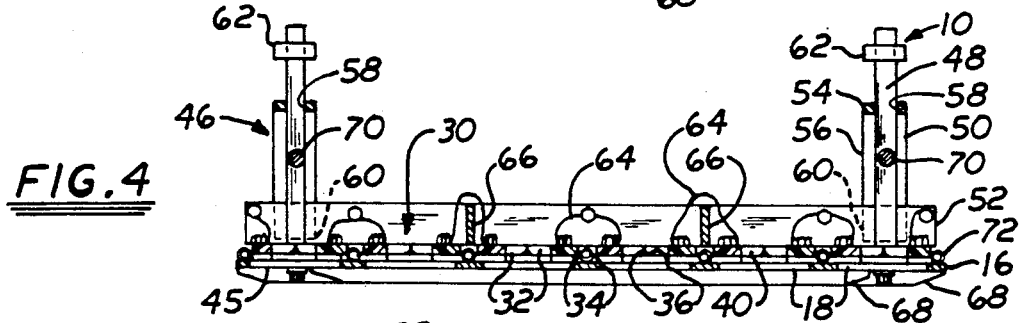
FIG. 4 is a sectional front elevation view of the case filling and unloading apparatus taken along line 4—4 of FIG. 2 illustrating the flaps in the closed position.

Attached to the guide plate 16 is a bottle holder actuating means, generally shown as 46, which can best be seen in FIGS. 1 and 3. The actuating means 46 comprises, in the preferred embodiment: two actuating bars 52, a plurality of connectors 64, and an actuating bar support means. The actuating bar support means comprises four posts 48, which are attached generally normal to the guide plate 16, and two brackets 50, slidably mounted on the posts 48. The two actuating bars 52 are each attached to the two brackets 50. The bracket 50 is formed in an inverted "U" with a base 54 and with an adjoining arm 56 projecting downward from each end of the base 54. The base 54 of each bracket 50 has a pair of apertures 58 therethrough which are sized and spaced to slidably fit around the posts 48. Each end 60 of the bracket arms 56 is attached to one of the actuating bars 52. The posts 48 are attached to the guide plate 16 such that each post 48 is proximal to one of the corners of the guide plate 16 so that each actuating bar 52 may make contact with each of the flaps 32. A stop means 62 is attached to each post 48 to prevent the brackets 50 from disengaging from the posts 48. Each flap 32 is connected to each actuating bar 52 by a connector 64, which may be a flexible cable as illustrated in the drawings.

As shown in FIG. 3, when the brackets 50 have been moved upward on the posts 48 to a point adjacent to the stops 62, the connectors 64 have pulled the flaps 32 into the open position such that a gap 42 exists between the flaps. By sliding the brackets 50 downward on the posts 48, the actuating bars 52 make contact with each flap 32 forcing them into the closed position as shown in FIG. 4.

The bottle holder actuating means 46 is strengthened by providing support bars 66 which connect the two actuating bars 52 and are spaced intermediate the ends of the actuating bars 52. In addition, support strips 68 have been attached to the bottom surface 45 of the guide plate 16 to reinforce the guide plate 16 and reduce its flexibility. Each pair of posts 48, connected by a bracket 50, are also joined together by a handle 70 to enable a person to pick up and move the case filling and unloading apparatus 10 manually.

In the preferred embodiment, the apparatus 10 is sized for a 24 bottle case and utilizes four posts, two brackets and two actuating bars. Another embodiment may be structured using a single actuating bar having each end attached to a bracket and having each bracket mounted on a single post. A third embodiment could have a generally centralized single post mounted in the center of the guide plate having a single bracket mounted thereon and a single actuating bar connected to this bracket. The case filling and unloading apparatus 10 would work quite well in any of these or similar configurations. It is the inventor's choice that for the preferred embodiment, multiple posts and actuating bars are used.

The case filling and unloading apparatus may be constructed of any suitable material. In the preferred embodiment shown in FIGS. 1-5, the flaps 32 have been constructed of plastic and the remainder of the structure is composed of aluminum. As can be seen in FIGS. 1-5, many of the parts have been joined by bolting and by welding; however, any suitable connecting means may be used. In FIGS. 1-4, a piano-type hinge 72 has been used to pivotally connect the flaps 32 to the guide plate 16; however, any suitable pivoting means known in the art may be used.

Having thus set forth a preferred construction for the case filling and unloading apparatus 10 of this invention, it is to be remembered that this is but a preferred embodiment.

Attention is now invited to a description of the use of the case filling and unloading apparatus 10. In order to unload a case 14 of bottles 12, the top of the case must be opened or removed. A person may then manually move the case filling and unloading apparatus to the opened case 14 by grasping a bracket 50 in each hand and picking up the case filling and unloading apparatus 10. By lifting upward on the brackets 50, they will freely slide upward to the stop means 62 causing the actuating bars 52 to move upward pulling the connectors 64 and thus, pulling the flaps 32 into the open position creating a gap 42 between the flaps 32. Each of the apertures 18 of the guide plate 16 are then situated so that each is located over the top 28 of a bottle 12 so that the case filling and unloading apparatus 10 may then be lowered onto the bottles 12. The guide plate 16 will come to rest on the neck portion 22 of each of the bottles 12 and the tops 28 of the bottles 12 will project upward between the gap 42 of the respective pair of flaps 38 and generally within the cutouts 40 of the flaps 32.

The case filling and unloading apparatus is now grasped by the handles 70 with the fingers of each hand and the thumb of each hand is rested upon the adjacent base 54 of the bracket 50. When the case filling and unloading apparatus 10 is lifted by the handles while opposingly squeezing with the thumb and finger, the brackets 50 are forced downward toward the guide plate causing the actuating bars 52 to engage each of the flaps 32. At the flaps 32 close, each of the cutouts 40 close about the neck 22 of a bottle 12 below the bottle lifting means 26. Since the cutouts 40 are so sized that the holes 44 defined by the cutouts 40 in the closed position are smaller than the bottle lifting means 26, the bottle lifting means 26 will rest upon the edges 41 of the cutouts, thus being captured by the bottle retaining means.

The case filling and unloading apparatus 10 is moved, along with the bottles 12, to a new location for placement. The bottles 12 may be removed from the case filling and unloading apparatus 10 by manually grasping one of the brackets 50 in each hand and lifting upward, causing the brackets 50 to slide upward on the posts 48, causing the actuating bars 52 to move upward pulling on the connectors 64, which then raise the flaps 32 moving them to the open position. In the open position, a gap 42 occurs between the flaps 32 that permit the bottle lifting means 26 to be freed from the cutouts 40, and thus, the bottles 12 remain behind as the case filling and unloading apparatus 10 is lifted upward.

It will thus be seen that the objects set forth above, among those made apparent from the preceding description, are efficiently attained and, may be made in the above article without departing from the scope of the invention. It is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A case filling and unloading apparatus for handling a plurality of bottles arranged in a predetermined pattern, each bottle having a top, a lifting means proximal said top, a neck, a body portion, a shoulder interposed between the neck and the body portion, and a bottom; said case filling and unloading apparatus comprising:
   a guide means to maintain said bottles in a predetermined pattern;
   at least one bottle holder comprising a pair of pivoting flaps connected to said guide means, said flaps having a first edge and a second edge, said pair of flaps having an open position and a closed position, said pair of flaps having a bottle retaining means for retaining said bottles in said bottle holder, each said flap having a pivot axis about which said flap may pivot, such that said pivot axis lies below a plane defined by said bottle tops when said bottles are retained by said bottle retaining means;
   a bottle holder actuating means comprising an actuating bar support means connected to said guide means, an actuating bar slidably connected to said actuating bar support means, such that said actuating bar may contact each of said flaps of said pair of flaps of each said bottle holder and a plurality of flexible cables operatively connecting said flaps of said bottle holder to said actuating bar and extending from points intermediate said first and second edges of said flaps to said actuating bar, such that when said actuating bar slides upwardly on said actuating bar support means, said connecting means pulls upward on said flaps of said bottle holder urging said flaps to said open position and when said actuating bar slides downward on said actuating bar support means, said actuating bar contacts said flaps of said bottle holder urging said flaps to said closed position; and a lifting means connected to said guide means to provide means for lifting and moving said case filling and unloading apparatus.

2. An apparatus as in claim 1 wherein said guide means comprises a guide plate having a bottom surface and a top surface and having apertures therethrough, said apertures spaced in a predetermined pattern and sized to fit around said bottles.

3. An apparatus as in claim 2 wherein each one of said flaps is pivotally connected to said guide plate along said first edge of said flap, such that said second edges of each of said flaps of said pair of flaps are generally parallel and proximal to one another, said closed position being defined by said second edges of said pair of flaps being adjacent one another, and said open position being defined by said second edges of said pair of flaps being spaced apart from one another.

4. An apparatus as in claim 3 wherein said bottle retaining means comprises opposing cutouts located on said second edges of said flaps, such that said opposing cutouts define a hole through said bottle holder when said flaps are in said closed position, said holes being so located that said holes overlap said apertures through said guide plate, such that when said bottle holder is in said closed position and the bottles are retained therein, the tops of the bottles project upward through said apertures of said guide plate and said holes of said bottle holder, said holes through said bottle holder having at least a portion of said hole with a diameter less than the outside diameter of the bottle lifting means, such that when said pair of flaps encircle at least a portion of the bottles, intermediate the bottle lifting means of the bottles and the bottom of the bottles, at least a portion of the bottle lifting means rests on said flaps, whereby the bottles are retained by said bottle retaining means of said bottle holder.

5. An apparatus as in claim 1 wherein said actuating bar support means comprises at least one post having a first end and a second end, said second end being attached to said guide means such that said post is generally normal thereto, a bracket slidably mounted on said post having at least one said actuating bar attached thereto, such that said actuating bar may selectively slide intermediate said first end of said post and said second end of said post.

6. An apparatus as in claim 5 wherein said actuating bar support means further comprises a stop means attached to said post, such that said bracket mounted on said post will be prevented from traveling beyond said first end of said post.

7. An apparatus as in claim 5 wherein said lifting means for lifting and moving said case filling and unloading apparatus comprises a handle attached to said post of said actuating bar support means.

8. A case filling and unloading apparatus for handling a plurality of bottles, arranged in a predetermined pattern, each bottle having a top, a lifting means proximal said top, a neck portion, a body portion, a shoulder interposed between the neck portion and the body portion, and a bottom, said case filling and unloading apparatus comprising:

a guide plate having a bottom surface and a top surface and having apertures therethrough, said apertures spaced in a predetermined pattern and sized to fit around the lifting means of the bottles;

at least one bottle holder comprising a pair of pivoting flaps, said flaps having a first edge and a second edge, each one of said flaps being pivotally connected to said guide plate along said first edge of said flap, such that said second edges of each of said flaps of said pair of flaps are generally parallel and proximal to one another, said pair of flaps having a closed position and an open position, said closed position being defined by said second edges of said pair of flaps being adjacent one another, and said open position being defined by said second edges of said pair of flaps being spaced apart from one another; a bottle retaining means comprising opposing cutouts located on said second edges of said flaps, such that said opposing cutouts define a hole through said bottle holder when said flaps are in said closed position, said holes being so located that said holes overlap said apertures through said guide plate, such that when said bottle holder is in said closed position and the bottles are retained therein, the tops of the bottles project upward through said apertures of said guide plate and said holes of said bottle holder, said holes through said bottle holder having at least a portion of said hole with a diameter less than the outside diameter of the bottle lifting means, such that when said pair of flaps encircle at least a portion of the bottles, intermediate the bottle lifting means of the bottles and the bottom of the bottles, at least a portion of the bottle lifting means rests on said flaps, whereby the bottles are captured by said bottle retaining means of said bottle holder; each said flap having a pivot axis such that said pivot axis lies below a plane defined by the bottle tops when the bottles are retained by said bottle retaining means;

a bottle holder actuating means comprising an actuating bar support means comprising a plurality of posts, each said post having a first end and a second end, said second end being attached to said guide plate such that said post is generally normal thereto; a plurality of brackets each slidably mounted on at least one of said posts such that said brackets may selectively slide between said first end of said post and said second end of said post; a plurality of actuating bars each attached to at least one of said brackets, such that when said brackets are moved downward, said actuating bars may together contact each one of said flaps of said pair of flaps of each said bottle holder, and by contacting said flaps, urge said flaps to said closed position; a plurality of connecting means, each comprising a flexible cable attached intermediate said first and said second edges of each said flap of each said bottle holder, operatively engaging said flaps to said actuating bar, such that when said brackets slide upwardly on said posts said connecting means pulls upward on said flaps of said bottle holder urging said flaps to said open position; and at least one lifting means comprising a handle connected between a pair of said posts to provide means for lifting and moving said case filling and unloading apparatus.

* * * * *